United States Patent
Belkar et al.

(10) Patent No.: US 12,105,654 B2
(45) Date of Patent: Oct. 1, 2024

(54) DEVICES, METHODS, AND SYSTEM FOR REDUCING LATENCY IN REMOTE DIRECT MEMORY ACCESS SYSTEM

(71) Applicant: Huawei Technologies Co., Ltd., Shenzhen (CN)

(72) Inventors: Ben-Shahar Belkar, Hod Hasharon (IL); Dima Ruinskiy, Hod Hasharon (IL); Lior Khermosh, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/988,564

(22) Filed: Nov. 16, 2022

(65) Prior Publication Data

US 2023/0090382 A1 Mar. 23, 2023

Related U.S. Application Data

(63) Continuation of application No. PCT/EP2020/071012, filed on Jul. 24, 2020.

(51) Int. Cl.
*G06F 13/30* (2006.01)
*G06F 15/173* (2006.01)

(52) U.S. Cl.
CPC ........ *G06F 13/30* (2013.01); *G06F 15/17331* (2013.01)

(58) Field of Classification Search
CPC .............. G06F 13/30; G06F 15/17331
See application file for complete search history.

(56) References Cited

U.S. PATENT DOCUMENTS

| | | | |
|---|---|---|---|
| 7,523,286 B2* | 4/2009 | Ramany | G06F 3/0653 711/170 |
| 7,688,838 B1* | 3/2010 | Aloni | G06F 13/385 370/395.7 |
| 8,589,603 B2* | 11/2013 | Craddock | G06F 13/28 710/1 |

(Continued)

FOREIGN PATENT DOCUMENTS

EP 3352086 A1 7/2018

OTHER PUBLICATIONS

"Priority Flow Control: Build Reliable Layer 2 Infrastructure" Cisco Systems, 2009, 8 pages.

(Continued)

*Primary Examiner* — Cheng Yuan Tseng
(74) *Attorney, Agent, or Firm* — Conley Rose, P.C.

(57) ABSTRACT

A sending device is configured to generate a first message that includes a first indication of a first operation type; transmit the first message to a receiving device over the communications interface; generate a second message that includes a second indication of a second operation type; determine whether the second operation type is associated with the first operation type; determine, in response to determining that the second operation type is associated with the first operation type, that the local pacing timer has exceeded a timer duration since transmitting the first message; and transmit, in response to determining that the local pacing timer has exceeded the timer duration since transmitting the first message, the second message to the receiving device over the communications interface.

20 Claims, 8 Drawing Sheets

(56) References Cited

U.S. PATENT DOCUMENTS

| | | | |
|---|---|---|---|
| 8,893,148 B2* | 11/2014 | Arimilli | G06F 9/522 |
| | | | 718/105 |
| 10,581,997 B2* | 3/2020 | Zhu | G06F 16/213 |
| 2018/0048732 A1 | 2/2018 | Zhu et al. | |

OTHER PUBLICATIONS

Lesokhin I, et al., "Page fault support for network controllers," ACM SIGOPS Operating Systems Review, Apr. 8-12, 2017, 18 pages.

Tezuka H et al., "Pin-down cache: A virtual memory management technique for zero-copy communication," In Proceedings of the First Merged International Parallel Processing Symposium and Symposium on Parallel and Distributed Processing, Mar. 30, 1998, 7 pages.

Mittal R et al., "Revisiting network support for RDMA," In Proceedings of the 2018 Conference of the ACM Special Interest Group on Data Communication (SIGCOMM 18). Association for Computing Machinery, New York, NY, USA, Aug. 20-25, 2018, 14 pages.

"Understanding on Demand Paging," May 28, 2022, 7 pages.

Amit N, et al.," vIOMMU: efficient IOMMU emulation," In USENIX Annual Technical Conference (ATC), Jun. 15, 2011, 14 pages.

\* cited by examiner

DEVICES, METHODS, AND SYSTEM FOR REDUCING LATENCY IN REMOTE DIRECT MEMORY ACCESS SYSTEM

CROSS-REFERENCE TO RELATED APPLICATIONS

This is a continuation of International Patent Application No. PCT/EP2020/071012 filed on Jul. 24, 2020, which is hereby incorporated by reference in its entirety.

TECHNICAL FIELD

The present disclosure relates generally to the field of data communication and remote direct memory access (RDMA) systems, and to sending devices, receiving devices, a system, and methods for reducing latency in a RDMA system.

BACKGROUND

Data communication at a high speed among several computing devices in a network, raises concerns about reliable data communication and latency. Some RDMA techniques are employed by multiple computing devices to increase speed in data communication. The RDMA techniques enable a computing device (e.g., a sending device) to directly access the memory of another computing device (e.g., a receiving device) without involving the operating system (OS) of any of the computing devices (i.e., the sending device and the receiving device). The RDMA techniques rely on synchronizing events to maintain a specific order of execution of data operations. For example, in an exemplary implementation scenario of an RDMA system, if synchronization of the sending device and the receiving device is not perfect, it may lead to an unreliable data communication. That is, if the sending device (i.e., an RDMA sender) initiates transmission of data (e.g., data packets) with the receiving device (i.e., an RDMA receiver) before execution of previous data operation at the receiving device, transmission of data (or data packets) is stalled or dropped. Furthermore, unsynchronised sending devices and receiving devices may lead to incomplete transmission of data (or data packet) and retransmission of data as well which in turn increases latency (e.g., tail latency) and lowers the throughput. Additionally, a flow control cannot be applied in a single connection resolution and it may adversely impact other connections those are sharing the same traffic class (or a traffic network). The flow control is not fine-grained per event (e.g., a page fault, a cache miss, etc.) which causes a significant increase in latency.

In another exemplary scenario, a non-pinned RDMA technique may be used to speed up the data communication. In the non-pinned RDMA technique, the responding device requires a virtual address (e.g., a target virtual address) of the requesting device for transmitting data. If the virtual address of the requesting device triggers a fault (e.g., a page fault), then the data transmission is stalled or dropped and may result in data retransmission which further increases transaction completion latency.

In another exemplary scenario of the RDMA, when data packets arrive at the receiving device, there may be requirement of additional information such as queue pair (QP) context, memory protection table (MPT) and memory translation table (MTT). As the sending device and the receiving device have a limited number of network interface controllers (e.g., network interface cards). Therefore, if many connections are established by use of the network interface controllers, then there is a probability of eviction of the information from a few connections into a host memory, by virtue of limited size of the network interface controller's cache. Thus, in some systems, fetching the information from the host memory consumes time and often, requires a few iterations also which results in increased latency and degraded performance.

In certain scenarios, an RDMA framework may use fences to enforce in-order execution of data operations. For example, in a case if a RDMA request is present with a "fence flag", then in such a case, the RDMA request is delayed by an RDMA sending device until an RDMA receiving device signals back to the RDMA sending device that a previous operation has been executed. In such cases, total execution time of the RDMA request is significantly increased due to the presence of fences and results in a high latency. The fence flags (or fencing) may result into an overload on the RDMA receiving device in case of storage of too many work queue elements (WQEs). Thus, there exists a technical problem of an inefficient and unreliable data communication by virtue of the devices, methods, and the RDMA system.

Therefore, in light of the foregoing discussion, there exists a need to overcome the aforementioned drawbacks associated with the sending device, the receiving device, and the methods of the RDMA techniques used for data communication.

SUMMARY

The present disclosure seeks to provide sending devices, receiving devices, methods, and a system for reducing latency in RDMA systems. The present disclosure seeks to provide a solution to the existing problem of inefficient and unreliable data communication by virtue of the devices, methods, and the RDMA system mentioned above. An aim of the present disclosure is to provide a solution that overcomes at least partially the problems encountered in other approaches, and provides improved devices, methods, and a system for an efficient (e.g., reduced latency) and reliable data communication. The object of the present disclosure is achieved by the solutions provided in the enclosed independent claims. Advantageous implementations of the present disclosure are further defined in the dependent claims.

In one aspect, the present disclosure provides a sending device. The sending device comprises a memory, a controller, and a communication interface. The memory is configured to store a local pacing timer. The controller is configured to generate a first message, the first message comprising an indication of a first operation type. The controller is further configured to transmit the first message to a receiving device over the communications interface. The controller is further configured to generate a second message, the second message comprising an indication of a second operation type. The controller is further configured to determine if the second operation type is associated with the first operation type, and if so the controller is further configured to determine if the local pacing timer has exceeded a timer duration since transmitting the first message, wherein the local pacing timer is a first operation type timer and, if so, the controller is further configured to transmit the second message to the receiving device over the communications interface.

The sending device of the present disclosure enables to determine if the second operation type related to RDMA is associated with the first operation type. In such a case, the sending device enables to transmit the second message to the receiving device without waiting for an indication message from the receiving device which indicates the completion of the first operation type. The sending device uses the local pacing timer to pace the transmission of multiple messages (or data packets) such as the first message and the second message. The local pacing timer is used to measure the timer duration since transmitting the first message. Once the local pacing timer exceeds the timer duration, the controller transmits the second message to the receiving device without waiting for the indication message. Thus, by use of the local pacing timer, the sending device significantly reduces the total execution time of the first message and the second message and thus improves the latency. Further, the local pacing timer also enables maintaining correct order of transmission of the first message and the second message and therefore, enables reliable data communication and increases overall throughput and efficiency.

In an implementation form, the controller is further configured to determine if the second operation type is not associated with the first operation type, and if so the controller is further configured to transmit the second message to the receiving device over the communications interface regardless whether the local pacing timer has exceeded the timer duration since transmitting the first message or not.

The controller of the sending device transmits the second message to the receiving device if the second operation type is not associated with the first operation type. Also, the controller does not wait for the local pacing timer to exceed the timer duration which in turn results in improved latency (or a fast data transaction) while maintaining the correct order of transmission of the first message and the second message.

In a further implementation form, the controller is further configured to generate a third message. The third message comprises an indication of a third operation type, wherein the third operation type is associated with the first operation type. The controller is further configured to determine if the local pacing timer has exceeded the timer duration since transmitting the second message and, if so, the controller is further configured to transmit the third message to the receiving device over the communications interface.

The third operation type is associated with the first operation type. For example, the third operation type starts executing when the second operation type has executed. The controller of the sending device uses the local pacing timer to pace the transmission of the third message in sequence to the transmission of the second message. The local pacing timer is used to measure the timer duration since transmitting the second message. Once the local pacing timer exceeds the timer duration, the controller transmits the third message to the receiving device without waiting for the indication message. Thus, the use of the local pacing timer significantly reduces the total execution time of the first message, the second message and the third message and hence, improves latency. Furthermore, the local pacing timer also enables to maintain a correct order of transmission of the first message, the second message and the third message and thus, enables reliable data transmission and increases throughput and efficiency.

In a further implementation form, the third operation type is the second operation type. This allows for sending and receiving multiple responses of the same time, using the same timer. In an example, if the second operation type is a RDMA read operation, then it is possible that the third operation type is also a RDMA read operation. In such a case, the response time of the receiving device decreases significantly.

In a further implementation form, the first operation type is the second operation type. This allows for sending multiple operations of the same type using the same local timer. In an example, if the first operation type is a RDMA write operation, then it is possible that the second operation type is also a RDMA write operation. In such a case, the response time of the receiving device decreases significantly.

In a further implementation form, the controller is further configured to receive an acknowledgement message from the receiving device and in response thereto transmit the second message to the receiving device over the communications interface regardless whether the local pacing timer has exceeded the timer duration.

In some cases, the acknowledgement message implies that the first message is successfully transmitted to the receiving device. Therefore, the controller transmits the second message to the receiving device after receiving the acknowledgement message regardless whether the local pacing timer has exceeded the timer duration. Thus, the acknowledgement message reduces the total execution time of the first message and the second message and improves the latency. The improved latency indicates the data communication at a higher speed.

In a further implementation form, the controller is further configured to adapt the timer duration.

The local pacing timer is dynamic and configurable by hardware, firmware, or software to account for different network conditions such as number of active connections, network congestion, memory policies at a RDMA device (e.g., a responder). For example, transmitting multiple messages over the communications interface may increase the time duration. Thus, the controller adapts according the timer duration to maintain correct order of transmission of the messages and improves latency and throughput.

In a further implementation form, the controller is further configured to adapt the timer duration based on one or more of a number of active connections established over the communications interface, information regarding an operating status of the receiver (i.e. the receiving device), a number of negative confirmation (e.g., NAK) messages received and a received indication from the receiver (i.e., the receiving device).

The aforementioned different network conditions are valid reasons for change in the timer duration. Therefore, adapting the controller according to such network conditions enables the local pacing timer to determine correct duration for transmitting the second message to the receiving device.

In a further implementation form, the timer duration is associated with the operation type, wherein a first timer duration is associated with one operation type and a second timer duration is associated with another operation type.

The first timer duration and the second timer duration may differ since different operation types take different time for execution. Therefore, the local pacing timer is configurable to account for different operation types to maintain correct order of transmission of different messages by the sending device.

In a further implementation form, the first operation type is associated with a memory area and wherein the second operation type is associated with the same memory area.

The association of the first operation type and the second operation type with the same memory area speed up the data communication.

In a further implementation form, the controller is further configured to in addition to determining if the local pacing timer has exceeded the timer duration since transmitting the first message also determine if a traffic congestion timer has exceeded a congestion timer duration since transmitting the first message and, if so, transmit the second message to the receiving device over the communications interface.

When multiple messages are transmitted at a time during multiple RDMA operations at the communication interface, it may lead to a network congestion. The traffic congestion timer is used to determine the congestion timer duration since transmitting the first message for successful transmission of the second message in situation of the network congestion. Thus, the controller provides reliable data transmission by use of the traffic congestion timer.

In a further implementation form, controller is further configured to in addition to determining if the local pacing timer has exceeded the timer duration since transmitting the first message also determine if the local pacing timer has exceeded the traffic congestion timer duration since transmitting the first message and, if so, transmit the second message to the receiving device over the communications interface.

The controller may control both the local pacing timer duration and the traffic congestion timer duration since transmitting the first message. The controller transmits the second message to the receiving device when the local pacing timer exceeds both the timer duration and the congestion timer duration since transmitting the first message. Thus, the controller enables successful transmission of the second message in situation of the network congestion by use of the local pacing timer and the traffic congestion timer.

In a further implementation form, the sending device is arranged to operate as a requesting device in a RDMA system. The requesting device uses the local pacing timer to determine an accurate time duration for transmission of the second message in the RDMA system and thus, enables reliable transmission of the second message.

In a further implementation form, the first operation type indicates a preparatory action to be performed by the receiving device and wherein the second operation type indicates an operation for which the preparatory action is performed. The preparatory action allows the receiving device to prepare its memory (such as the local memory buffers) before actual RDMA request arrives at the receiving device. Performing the preparatory action reduces the execution time for the second operation type and hence, results in a reduction of the total transaction latency and makes the data communication faster.

In a further implementation form, the sending device is arranged to operate as a responding device in a RDMA system. The sending device has the capability to act both as the requesting device and the responding device, as per need.

In a further implementation form, the first operation type indicates a read operation and the first message indicates a read result and wherein the second operation type indicates the read operation and the second message indicates a subsequent read result. The second operation type is executed consecutively to the first operation type therefore, the second message provides the subsequent read result to the read result provided by the first message.

In another aspect, the present disclosure provides a sending device. The sending device comprises a memory and a communication interface, and software modules. The software modules include a first message generator software module for generating a first message. The first message comprises an indication of a first operation type. The software modules further include a first message transmitter software module for transmitting the first message to a receiving device over the communications interface. The software modules further include a second message generator software module for generating a second message. The second message comprises an indication of a second operation type. The software modules further include an operation type association determining software module for determining if the second operation type is associated with the first operation type, and if so executing a duration determining software module for determining if a local pacing timer has exceeded a timer duration since transmitting the first message. The local pacing timer is a first operation type timer and, if so executing a second message transmitter software module for transmitting the second message to the receiving device over the communications interface.

The software modules are executed to enable to determine if the second operation type is associated with the first operation type in a RDMA operation. In such situation, the software modules enable to transmit the second message to the receiving device without waiting for an indication message from the receiving device which indicates completion of the first operation type. The duration determining software module is used to pace the transmission of the first message and the second message. The local pacing timer is used to measure the timer duration since transmitting the first message. Once the local pacing timer exceeds the timer duration, the second message transmitter software module transmits the second message to the receiving device without waiting for the indication message. Thus, the duration determining software when executed significantly reduces the total execution time of the first message and the second message and hence, speed up the data communication. Further, the duration determining software when executed also enables to maintain correct order of transmission of the first message and the second message and thus, increases overall throughput and data communication reliability.

In another aspect, the present disclosure provides a method for a sending device. The method comprises generating a first message, the first message comprising an indication of a first operation type. The method further comprises transmitting the first message to a receiving device over the communications interface. The method further comprises generating a second message, the second message comprising an indication of a second operation type. The method further comprises determining if the second operation type is associated with the first operation type, and if so determining if a local pacing timer has exceeded a timer duration since transmitting the first message, wherein the local pacing timer is a first operation type timer and, if so, transmitting the second message to the receiving device over the communications interface.

The method of this aspect achieves all the advantages and effects of the sending device of the present disclosure.

In an implementation form, a computer-readable medium carrying computer instructions that when loaded into and executed by a controller of a sending device enables the sending device to implement the method.

The computer-readable medium (further, a non-transitory computer-readable medium) carrying computer instructions achieves all the advantages and effects of the sending device, or the method.

In another aspect, the present disclosure provides a receiving device comprising a communications interface and a controller, wherein the controller is configured to receive a first message from a sending device over the communications interface, the first message indicating a first operation. The controller is further configured to execute the first operation. The controller is further configured to receive a second message from a sending device over the communications interface, the second message indicating a second operation, wherein the second operation is associated with the first operation. The controller is further configured to determine if the first operation is being executed, and if so, generate an indication message comprising an indication to this effect and transmit the indication message to the sending device.

As the second operation is associated with the first operation, the controller of the receiving device determines if the first operation is being executed before starting execution of the second message. This is done to ensure correct order of execution of the first message and the second message by the controller of the receiving device. The controller of the receiving device transmits the indication message to the sending device to acknowledge that the first operation is successfully executed. This decreases buffer overflow on the receiving device and increases the overall throughput.

In another aspect, the present disclosure provides a receiving device. The receiving device comprises a memory and a communication interface, and software modules. The software modules include a first message receiving software module for receiving a first message from a sending device over the communications interface. The first message indicating a first operation. The software modules further include an operation executing software module for executing the first operation. The software modules further include a second message receiving software module for receiving a second message from a sending device over the communications interface. The second message indicates a second operation, wherein the second operation is associated with the first operation. The software modules further include an operation execution determining software module for determining if the first operation is being executed, and if so, executing an indication message generating software module for generating an indication message comprising an indication to this effect and an indication message transmitter software module for transmitting the indication message to the sending device.

The operation execution determining software module determines if the first operation is being executed before starting execution of the second message. This ensures correct order of execution of the first message and the second message by the controller of the receiving device. The indication message transmitter software module of the receiving device transmits the indication message to the sending device to acknowledge that the first operation is executed. This decreases buffer overflow on the receiving device and increases the overall throughput.

In another aspect, the present disclosure provides a method for a receiving device. The method comprises receiving a first message from a sending device over the communications interface, the first message indicating a first operation. The method further comprises executing the first operation. The method further comprises receiving a second message from a sending device over the communications interface, the second message indicating a second operation, wherein the second operation is associated with the first operation. The method further comprises determining if the first operation is being executed, and if so, generating an indication message comprising an indication to this effect and transmitting the indication message to the sending device. The method of the aspect achieves all the advantages and effects of the receiving device of the present disclosure.

In an implementation form, a computer-readable medium carrying computer instructions that when loaded into and executed by a controller of a receiving device enables the receiving device to implement the method. The computer-readable medium carrying computer instructions achieves all the advantages and effects of the receiving device, or the method.

In another implementation form, the present disclosure provides a system. The system comprises the sending device and the receiving device according to the aforementioned claims. The system of the present disclosure provides an improved data communication reliability and low latency which in turn speed up the data communication.

It has to be noted that all devices, elements, circuitry, units, modules and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
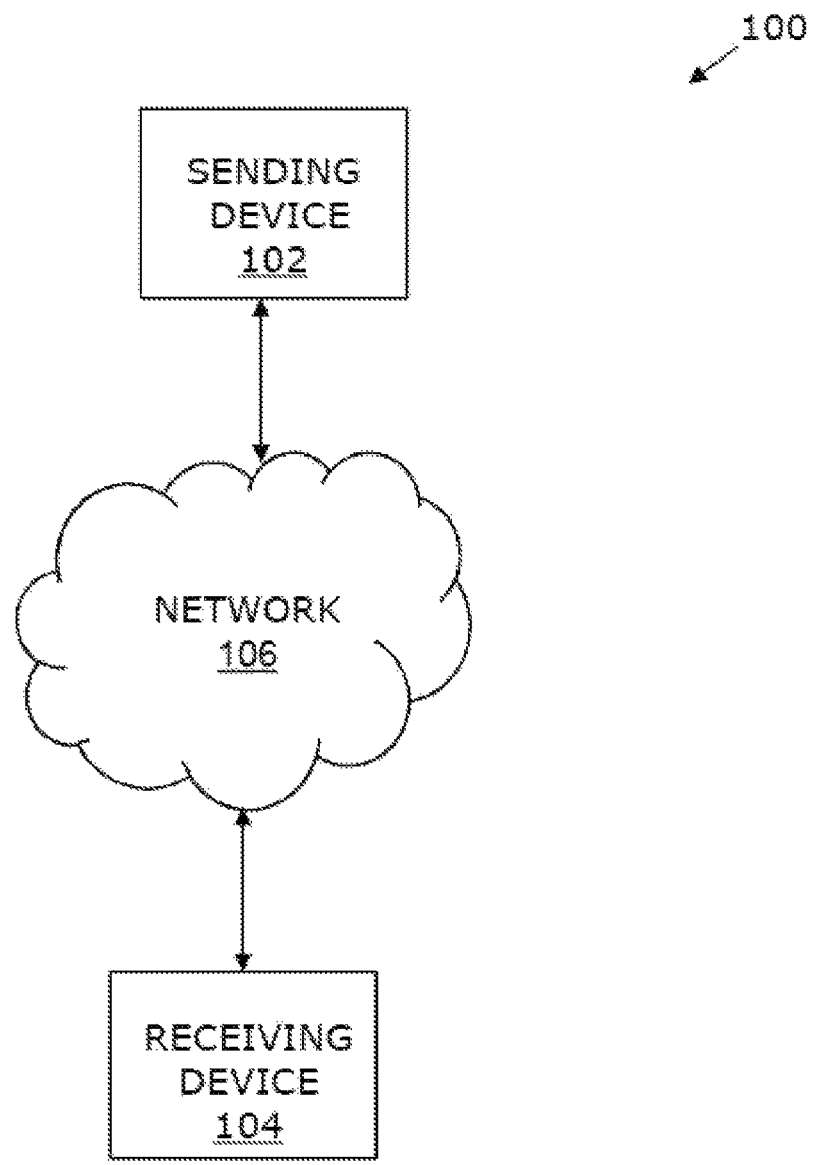
FIG. 1 is a network environment diagram of an exemplary RDMA system with a sending device and a receiving device, in accordance with an embodiment of the present disclosure.

FIG. 1 is a network environment diagram of an exemplary RDMA system with a sending device and a receiving device, in accordance with an embodiment of the present disclosure. With reference to FIG. 1, there is shown a network diagram of a RDMA system 100 that includes a sending device 102 and a receiving device 104. There is further shown a network 106.

In the RDMA system 100, the sending device 102 can directly access a memory of the receiving device 104 without involving operating system (OS) of the sending device 102 and the receiving device 104. In the RDMA system 100, data is transferred directly without being copied between network layers of the sending device 102 and the receiving device 104. The data is transferred, for example, in the form of one or more data packets in the RDMA system 100. The data packet comprises information related to the packet sequence number (PSN) to enforce correct packet ordering. In an example, the data packet further comprises source and destination QP numbers, which distinguish an application and valid memory regions for the application. In one embodiment, the memory region has a memory key (R-key) that is part of the data packet, which associates the memory region with the applicant, and vice-versa. The data packet further comprises information related to a message type (such as a RDMA READ, a RDMA WRITE, a SEND, or an ATOMIC) and parameters of the message such as (a message length, a target memory address, an operation type and an operand data). In the RDMA system 100, time interval between transmission of various data packets is controlled (or programmed) by use of a timer to pace any number of consecutive data packets. The programming of the time interval between transmission of various data packets enables reliable data communication and reduced latency which in turn speed up the data communication over an RDMA system where no time interval is programmed.

The sending device 102 includes suitable logic, circuitry, interfaces and/or code that is configured for use in a high-speed data communication system, such as the RDMA system 100. The sending device 102 can directly access memory of the receiving device 104 for executing any RDMA operation such as the RDMA READ, the RDMA WRITE, the SEND, or the ATOMIC operations. The sending device 102 uses a locally running timer (e.g., a local pacing timer, described in detail, for example, in FIG. 2A) to pace the transmission of different data packets. The locally running timer is dynamic and configurable by hardware, software, or firmware to account for various network conditions such as network congestion, memory policies etc. The locally running timer may be started after sending a data packet which can be marked as an event data packet such as a "hint" data packet or a "fence" data packet. The locally running timer is used independently for different data packets regardless of the event data packet. The use of the locally running timer for transmission of different data packets reduces the possibility of a drop or stall of data packets at the receiving device 104 and therefore, enables reliable data communication. Moreover, the use of the locally running timer at the sending device 102 also avoids the penalty of waiting for a full round trip-time in case of receiving an acknowledgement message for the event data packets such as the "hint" data packet or the "fence" data packet and hence, results in low latency. The fine-tuning (or programming) of the locally running timer reduces the processing time at the receiving device 104. The locally running timer can be detected by looking on wire traffic and detecting special data packets (e.g., the event data packet). In this way, the sending device 102 enables the RDMA system 100 to have an improved data communication reliability and the low latency by use of the locally running timer. The low latency incorporated by the RDMA system 100 represents an improved data communication speed which means the RDMA system 100 is much faster in comparison to other RDMA systems. The sending device 102 can be potentially used as a requesting device (or a requester) in the RDMA system 100. Examples of the sending device 102 may include, but are not limited to, a network adapter, a server, a computing device in a computer cluster (e.g., massively parallel computer clusters), a communication apparatus including a portable or non-portable electronic device, a telematics control unit (TCU) in a vehicle, a drone, a wireless modem, a supercomputer, or other RDMA-based device. The various exemplary components of the sending device 102 are described in detail, for example, in FIG. 2A.

The receiving device 104 includes suitable logic, circuitry, interfaces and/or code that is configured for use in the high-speed data communication system such as the RDMA system 100. The receiving device 104 prepares its memory (e.g., local memory buffers) soon after receiving the event data packet such as the "hint" data packet or the "fence" data packet from the sending device 102 in order to reduce the response time. The receiving device 104 does not need to send the acknowledgement message for successfully receiving the event data packet to the sending device 102 by use of the locally running timer. This in turn, reduces the total transaction time for the RDMA operation and speed up the data communication. The receiving device 104 can be potentially used as a responding device (or a responder) in the RDMA system 100. Examples of the receiving device 104 may include, but are not limited to, a network adapter, a server, a computing device in a computer cluster (e.g., massively parallel computer clusters), a communication apparatus including a portable or non-portable electronic device, a TCU in a vehicle, a drone, a wireless modem, a supercomputer, or other RDMA-based device. The various exemplary components of the receiving device 104 are explained in detail, for example, in FIG. 2B.

The network 106 includes a medium (e.g., a communication channel) through which the sending device 102, potentially communicates with the receiving device 104. Examples of the network 106 include, but are not limited to, a computer network in a computer cluster, a local area network (LAN), a cellular network, a wireless sensor network (WSN), a cloud network, a vehicle-to-network (V2N) network, a metropolitan area network (MAN), and/or the Internet. The sending device 102 in the network environment is configured to connect to the receiving device 104, in accordance with various network protocols which support RDMA. Examples of such network protocols, communication standards, and technologies may include, but are not limited to, InfiniB and (IB), RDMA over Converged Ethernet (RoCE), Internet Wide Area RDMA protocol (iWARP), or modifications and variations thereof, and the like.

Figure 2A:
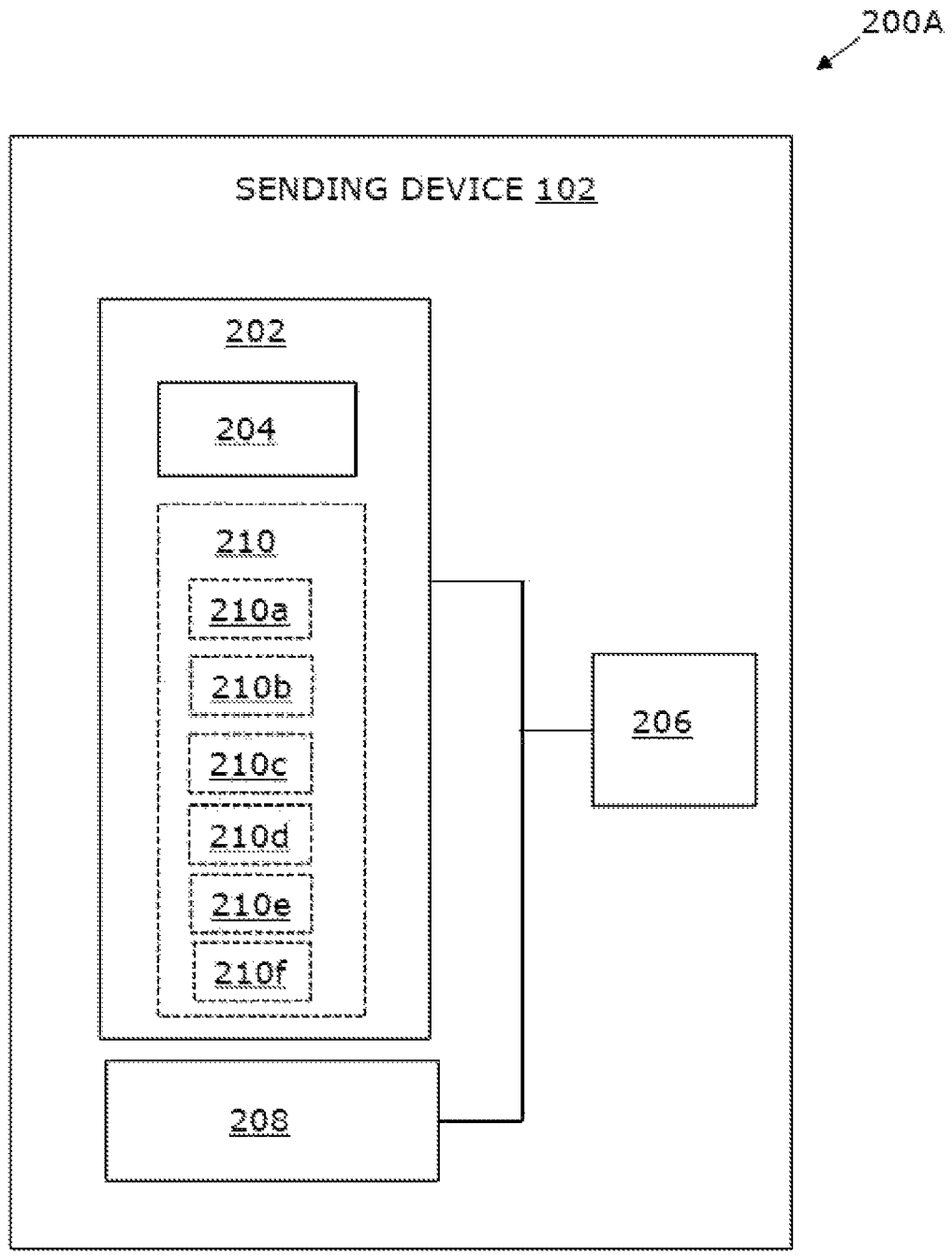
FIG. 2A is a block diagram that illustrates various exemplary components of a sending device, in accordance with an embodiment of the present disclosure.

FIG. 2A is a block diagram that illustrates various exemplary components of a sending device, in accordance with an embodiment of the present disclosure. With reference to FIG. 1, there is shown the sending device 102. The sending device 102 comprises a memory 202 that further comprises a local pacing timer 204. The sending device 102 further comprises a controller 206 and a communication interface 208. In an implementation, the sending device 102 further comprises one or more software modules, such as software modules 210.

The memory 202 includes suitable logic, circuitry, and/or interfaces that is configured to store instructions executable to control the sending device 102. The memory 202 may store data (communicated in the form of data packets) for processing at the sending device 102. Examples of implementation of the memory 202 may include, but are not limited to, electrically erasable programmable read-only memory (EEPROM), random-access memory (RAM), read-only memory (ROM), hard disk drive (HDD), Flash memory, a Secure Digital (SD) card, solid-state drive (SSD), and/or central processing unit (CPU) cache memory. The memory 202 may store an operating system and/or other program products to operate the sending device 102. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

The local pacing timer 204 is a specialized type of a clock which is used to measure time intervals during the transmission of different data packets. The local pacing timer 204 counts down from a specified time interval and used to generate a time delay. The RDMA operations are generally time-sensitive and the transmitted data packets rely on specific timing events for a reduced latency and a higher throughput. The local pacing timer 204 is used to pace multiple data packets in the RDMA system. Additionally, the local pacing timer 204 is used to maintain a correct sequence of transmission of the multiple data packets depending on the time interval between the data packets. In an implementation, the local pacing timer 204 is potentially different from global general timers. The local pacing timer 204 is dynamic and configurable according to different network conditions. The local pacing timer 204 is also used in such situations where "hints" packets are not used prior to the transmission of the data packet. The local pacing timer may also be referred as a prefetch traffic pacer.

The controller 206 includes suitable logic, circuitry, and/or interfaces that is configured to generate a first message, the first message comprising an indication of a first operation type. The controller 206 is a computational element that is configured to processes instructions that drive the sending device 102. Examples of the controller 206 includes, but are not limited to, a network interface controller, a microprocessor, a microcontroller, a complex instruction set computing (CISC) microprocessor, a reduced instruction set computing (RISC) microprocessor or a very long instruction word (VLIW) microprocessor.

The communication interface 208 is an arrangement of interconnected programmable and/or non-programmable components that are configured to facilitate data communication between one or more electronic devices. For example, the communication interface 208 refers to a network interface card (NIC) configured to process a send queue (SQ), read work queue elements (WQEs) and generates data packets to send to the other computing device. The communication interface 208 may support communication protocols for one or more of peer-to-peer network, a hybrid peer-to-peer network, local area networks (LANs), radio access networks (RANs), metropolitan area networks (MANs), wide area networks (WANs), all or a portion of a public network such as the global computer network known as the Internet, a private network, a cellular network and any other communication system or systems at one or more locations. Additionally, the communication interface 208 supports wired or wireless communication that can be carried out via any number of known protocols, including, but not limited to, Internet Protocol (IP), Wireless Access Protocol (WAP), Frame Relay, or Asynchronous Transfer Mode (ATM). Moreover, any other suitable protocols using voice, video, data, or combinations thereof, can also be employed and supported by the communication interface 208.

In an exemplary implementation, the software modules 210 include one or more message generator software modules (such as a first message generator software module 210a and a second message generator software module 210b), one or more message transmitter software modules (such as a first message transmitter software module 210c and a second message transmitter software module 210d), an operation type association determining software module 210e, and a duration determining software module 210f In an implementation, the software modules 210 (which includes the software modules 210a to 210f) are potentially implemented as separate circuits in the sending device 102. Alternatively, in another implementation, the software modules 210 are implemented as a circuitry to execute various operations of software modules 210a to 210f.

In operation, the controller 206 is configured to generate a first message, the first message comprising an indication of a first operation type. The first message is generated by the controller 206 to initiate the RDMA operation with the other computing device (i.e., the receiving device 104). The first message indicates the first operation type such as a RDMA read operation, a RDMA write operation, a send operation, or an atomic operation. The first message is transmitted, for example, in the form of one or more data packets. The controller 206 of the sending device 102 is further configured to process a send queue (SQ), to read a work queue element (WQE) and to generate data packets and send to the receiving device 104.

In an example, the first message (or the data packet) potentially comprises a PSN to enforce correct order of the first message and subsequent other messages (or data packets). The first message further comprises source and destination QP numbers. Each QP number has a context at the sending device 102 and at the other computing device (i.e., the receiving device 104). The first message further comprises various parameters such as a message length, target memory address and operation type and operand data. The message length includes the length of the RDMA read operation, the RDMA write operation, or the send operation. The memory address includes a target memory address for the RDMA read operation, the RDMA write operation and the atomic operation. The send operation does not have a target memory address. The operation type and operand data for the atomic operation type.

The controller 206 is further configured to transmit the first message to the receiving device 104 over the communication interface 108. The first message is transmitted to the receiving device 104 to process the first operation type. For example, if the first operation type is a RDMA read operation, then the receiving device 104 performs the RDMA read operation according to the first message.

The controller 206 is further configured to generate a second message, the second message comprising an indication of a second operation type. In a sequence to the first message, the second message is generated by the controller 206 to initiate a second RDMA operation with the receiving device 104. The second message indicates the second operation type which may be a RDMA read operation, a RDMA write operation, a send operation, or an atomic operation. The second message is also transmitted, for example, in the form of one or more data packets. The data packet of the second message includes the various parameters (e.g. the message type, message length, or memory address) of different values with respect to the data packet of the first message.

The controller 206 is further configured to determine if the second operation type is associated with the first operation type, and if so determine if the local pacing timer 204 has exceeded a timer duration since transmitting the first message, wherein the local pacing timer 204 is a first operation type timer and, if so, transmit the second message to the receiving device 104 over the communication interface 208. Typically, the association of the second operation type to the first operation type is represented by use of fencing. In a case of fencing, if the second operation type is fenced by the first operation type then, the second operation type is executed only after the execution of the first operation type. In such a case, a receiving device in other approaches transmits a response message (or response messages) with respect to the first operation type to a transmitting device of the other approaches. The response message indicates the execution of the first operation type. After receiving the response message, the transmitting device of the other approaches communicates the second message (comprising the second operation type) to the receiving device in the other approaches and this complete cycle consumes a lot of time. This in turn increases the latency and slow down the data communication. However, in the present disclosure, the issue is resolved by use of the local pacing timer 204. In case of the fencing, where the second operation type is fenced by the first operation type, the local pacing timer 204 is used at the sending device 102. The local pacing timer 204 is used to introduce a predefined time delay between the transmission of the second message (comprising the second operation type) and execution of the first operation type. After the predefined time delay expires, the sending device 102 communicates the second message (comprising the second operation type) to the receiving device 104, regardless whether the first operation type is completely executed or not. In this way, the local pacing timer 204 reduces the overall response time of the sending device 102 and the receiving device 104 as well, in turn reduces the latency and hence, makes the data communication faster.

In accordance with an embodiment, the controller 206 is further configured to in addition to determining if the local pacing timer 204 has exceeded the timer duration since transmitting the first message also determine if a traffic congestion timer has exceeded a congestion timer duration since transmitting the first message and, if so, transmit the second message to the receiving device 104 over the communication interface 108. Usually, multiple messages are transmitted at a time to initiate multiple RDMA operations via the communication interface 208. This may lead to network congestion if the communication interface 208 is carrying more messages than the communication interface 208 may handle. The network congestion may cause queuing delay, message loss or blocking of new connections which in turn may increase the total tail latency and lowers the throughput. For example, the second message is transmitted when the local pacing timer 204 has exceeded the timer duration since transmitting the first message without considering network congestion that may lead to unsuccessful transmission of second message and cause the message loss. Hence, transmission of the multiple messages needs to be controlled when network congestion occurs. Transmission of the multiple messages in network congestion is controlled by using the traffic congestion timer or other congestion control mechanism. The traffic congestion timer is a specialized type of a clock which is used to control the congestion timer duration. The congestion timer duration indicates time required for a message to be successfully transmitted by the controller 206 in the situation of the network congestion. The traffic congestion timer may start when the sending device 102 transmits the first message and stops when the acknowledgment arrives to the sending device 102 indicating the reception of the first message. The controller 206 is configured to transmit the second message when the local pacing timer 204 exceeds the timer duration since transmitting the first message along with the traffic congestion timer when exceeds the congestion timer duration since transmitting the first message for successful transmission of the second message in situation of the network congestion.

In accordance with an embodiment, the controller 206 is further configured to in addition to determining if the local pacing timer 204 has exceeded the timer duration since transmitting the first message also determine if the local pacing timer 204 has exceeded a congestion timer duration since transmitting the first message and, if so, transmit the second message to the receiving device 104 over the communication interface 208. The local pacing timer 204 may control both the timer duration and the congestion timer duration since transmitting the first message. The controller 206 transmits the second message to the receiving device 104 over the communication interface 208 when the local pacing timer 204 exceeds both the timer duration and the congestion timer duration since transmitting the first message.

In accordance with an embodiment, the controller 206 is further configured to determine if the second operation type is not associated with the first operation type and if so transmit the second message to the receiving device 104 over the communication interface 208 regardless whether the local pacing timer 204 has exceeded the timer duration since transmitting the first message or not. If the second operation type (e.g., a read or a write operation) is not associated (or not fenced) with the first operation type, then the second message is transmitted to the receiving device 104 over the communication interface 208 regardless to whether the local pacing timer 204 has expired or not. Hence, there is no requirement to determine if the local pacing timer 204 has exceeded the timer duration since transmitting the first message or not.

In accordance with an embodiment, the controller 206 is further configured to receive an acknowledgement message from the receiving device 104 and in response thereto transmit the second message to the receiving device 104 over the communication interface 208 regardless whether the local pacing timer 204 has exceeded the timer duration. The acknowledgement message is a signal that is passed between communication devices to indicate successful transmission of a message. When the controller 206 of the sending device 102 receives the acknowledgement message from the receiving device 104 after transmitting the first message, it implies that the first message is successfully received at the receiving device 104. Therefore, the controller 206 transmits the second message to the receiving device 104 after receiving the acknowledgement message regardless whether the local pacing timer 204 has exceeded the timer duration.

In accordance with an embodiment, the first operation type is the second operation type. For example, if the first operation type is a read operation, then it is possible that the second operation type is also a read operation. In such a case, the response time of the sending device 102 and the receiving device 104 gets reduced significantly.

In accordance with an embodiment, the first operation type indicates a read operation and the first message indicates a read result and wherein and the second operation type indicates the read operation and the second message indicates a subsequent read result. In the first message, the sending device 102 sends the request of the read operation to be performed by the receiving device 104. Similarly, in the second message, the sending device 102 sends the request of another read operation in a subsequence to the read operation of the first message, to be performed by the receiving device 104. The first message and the second message display the read results which are subsequently related to each other.

In accordance with an embodiment, the first operation type is associated with a memory area and wherein the second operation type is associated with the same memory area. For example, in a case, if the first operation type is a read operation and associated with the memory area (e.g., a memory address or local memory buffers, for example, of receiving device 104). And the second operation type is a write operation and is performed by writing a particular value at the same memory area (i.e., the memory address or local memory buffers, for example, of receiving device 104) which is read by the first operation type. Then in such case, the second operation type is associated with the same memory area as the first operation type.

In accordance with an embodiment, the controller 206 is further configured to generate a third message, the third message comprising an indication of a third operation type, wherein the third operation type is associated with the first operation type. The controller 206 is further configured to determine if the local pacing timer 204 has exceeded the timer duration since transmitting the second message and, if so, transmit the third message to the receiving device 104 over the communication interface 208. The third message is generated by the controller 206 to initiate a third RDMA operation with the receiving device 104. The third message indicates the third operation type which may be a read operation, a write operation, a send operation or an atomic operation. The third message is transmitted in the form of one or more data packets. The third operation type is fenced to enforce transmission of the first operation type, the second operation type and the third operation type in a particular order with a pre-determined time delay. For example, the third operation type is executed after the pre-determined delay from execution of the second operation type. The sending device 102 uses the local pacing timer 204 to control the pre-determined time delay between transmission of the third message and the second message. The pre-determined time delay is the amount of time required to maintain proper order of execution of the third operation type and the second operation type. In an example, the local pacing timer 204 may be started by the controller 206 of the sending device 102 after transmitting the second message to the receiving device 104. In another example, the local pacing timer 204 may be started by the controller 206 of the sending device 102 after transmitting the first message to the receiving device 104. The local pacing timer 204 expires when the timer delay exceeds the pre-determined timer duration since transmitting the second message. Once the local pacing timer 204 is expired, the controller 206 transmits the third message to the receiving device 104 over the communication interface 208. Hence, the local pacing timer 204 reduces total transmission time of the third message and the second message significantly and reduces latency.

In an example, the data packet of the third message may potentially comprise a PSN to enforce correct order of the third message. The third message also comprises Source and Destination QP numbers. The third message potentially further comprises memory address for the read operation, the write operation and the atomic operation. The third message further comprises an operation type and an operand data.

In accordance with an embodiment, the third operation type is the second operation type. For example, if the second operation type is a read operation then it is possible that in the same case, the third operation type is also a read operation.

In accordance with an embodiment, the timer duration is associated with the operation type, wherein a first timer duration is associated with one operation type and a second timer duration is associated with another operation type. The first timer duration is the time duration required since transmitting the first message to maintain proper order of transmission of the first message and the second message over the communication interface 208. The second timer duration is the time duration required since transmitting the second message to maintain proper order of transmission of the third message and the second message over the communication interface 208. The first timer duration and the second timer duration may differ by virtue of the different network conditions.

In accordance with an embodiment, the controller 206 is further configured to adapt the timer duration. The first timer duration and the second timer duration may vary according to the varying conditions of the communication interface 208. Further, the local pacing timer 204 is dynamic and configurable to account for different time durations for different network conditions. Thus, the controller 206 adapts according to the timer duration to maintain a correct order of transmission of the first message and the second message and the third message as well.

In accordance with an embodiment, the controller 206 is further configured to adapt the timer duration based on one or more of a number of active connections established over the communication interface 208, information regarding an operating status of the receiver (i.e., the receiving device 104), a number of negative confirmation (NAK) messages received and a received indication from the receiver (i.e., the receiving device 104). Multiple messages are transmitted at a time to initiate multiple RDMA operations in the communication interface 208. This may lead to network congestion if the communication interface 208 is carrying more messages than the communication interface 208 may handle. For example, the second message is transmitted when the local pacing timer 204 has exceeded the timer duration since transmitting the first message without considering network congestion that may lead to unsuccessful transmission of second message and cause the message loss. Hence, the controller 206 adapts according to the timer duration in network congestion.

Further, the controller 206 adapts according to operating status of the receiver (i.e., the receiving device 104). For example, the controller 206 adapts to the timer duration that is determined for various conditions such as time delay in memory reallocation for a message, software and hardware malfunction of the receiver or rate of execution of message by the receiver (i.e., the receiving device 104).

The NAK messages are sent to the sending device 102 to indicate rejection of a previously received message or to indicate some errors in the receiver. The NAK messages may increase the timer duration between transmission of the first message and the second message. The sending device 102 may take time to receive the indication from the receiving device 104 that may further increase the timer duration. Thus, the controller 206 adapts according to change in the timer duration for successful transmission of the second message.

In accordance with an embodiment, the sending device 102 is arranged to operate as a requesting device in a RDMA system. The sending device 102 (or the requesting device) generates the messages to send to the receiving device 104 for the RDMA system 100. In accordance with another embodiment, the sending device is arranged to operate as a responding device in the RDMA system 100.

In accordance with an embodiment, the first operation type indicates a preparatory action to be performed by the receiving device 104 and wherein the second operation type indicates an operation for which the preparatory action is performed. For example, the first operation type may include execution of an event packet (e.g., a hint packet or a fence packet). On receiving the event packet, the receiving device 104 prepares its memory (e.g., local memory buffers) for executing the second operation type (e.g., an actual RDMA write or read request). The preparation of the memory by the receiving device 104 indicates the preparatory action which is performed by the receiving device 104 and this in turn reduces the total response time and speed up the data communication.

In an exemplary aspect, the sending device 102 comprises the memory 202 and the communication interface 208, and software modules 210. The software modules 210 includes the first message generator software module 210a for generating a first message, the first message comprising an indication of a first operation type. The software modules 210 further includes the first message transmitter software module 210c for transmitting the first message to the receiving device 104 over the communications interface 208. The software modules 210 further comprises the second message generator software module 210d for generating a second message, the second message comprising an indication of a second operation type. The software modules 210 further includes the operation type association determining software module 210e for determining if the second operation type is associated with the first operation type, and if so executing the duration determining software module 210f for determining if the local pacing timer 204 has exceeded a timer duration since transmitting the first message, wherein the local pacing timer 204 is a first operation type timer, and, if so executing the second message transmitter software module 210d for transmitting the second message to the receiving device 104 over the communications interface 208.

In case where the second operation type is associated with the first operation type, the second message transmitter software module 210d transmits (or causes to be transmitted) the second message to the receiving device 104 without waiting for an indication message from the receiving device 104 which indicates completion of the first operation type. The duration determining software module 210f is used to pace the transmission of the first message and the second message. The local pacing timer 204 is used to measure the timer duration since transmitting the first message. Once the local pacing timer 204 exceeds the timer duration, the second message transmitter software module 210d transmits the second message to the receiving device 104 without waiting for the indication message. Thus, the duration determining software module 210f when executed significantly reduces the total execution time of the first message and the second message and hence, speed up the data communication. Further, duration determining software module 210f when executed also enables to maintain correct order of transmission of the first message and the second message and thus, increases overall throughput and data communication reliability. The software modules 210 are executed by the controller 206 of the sending device 102.

Figure 2B:
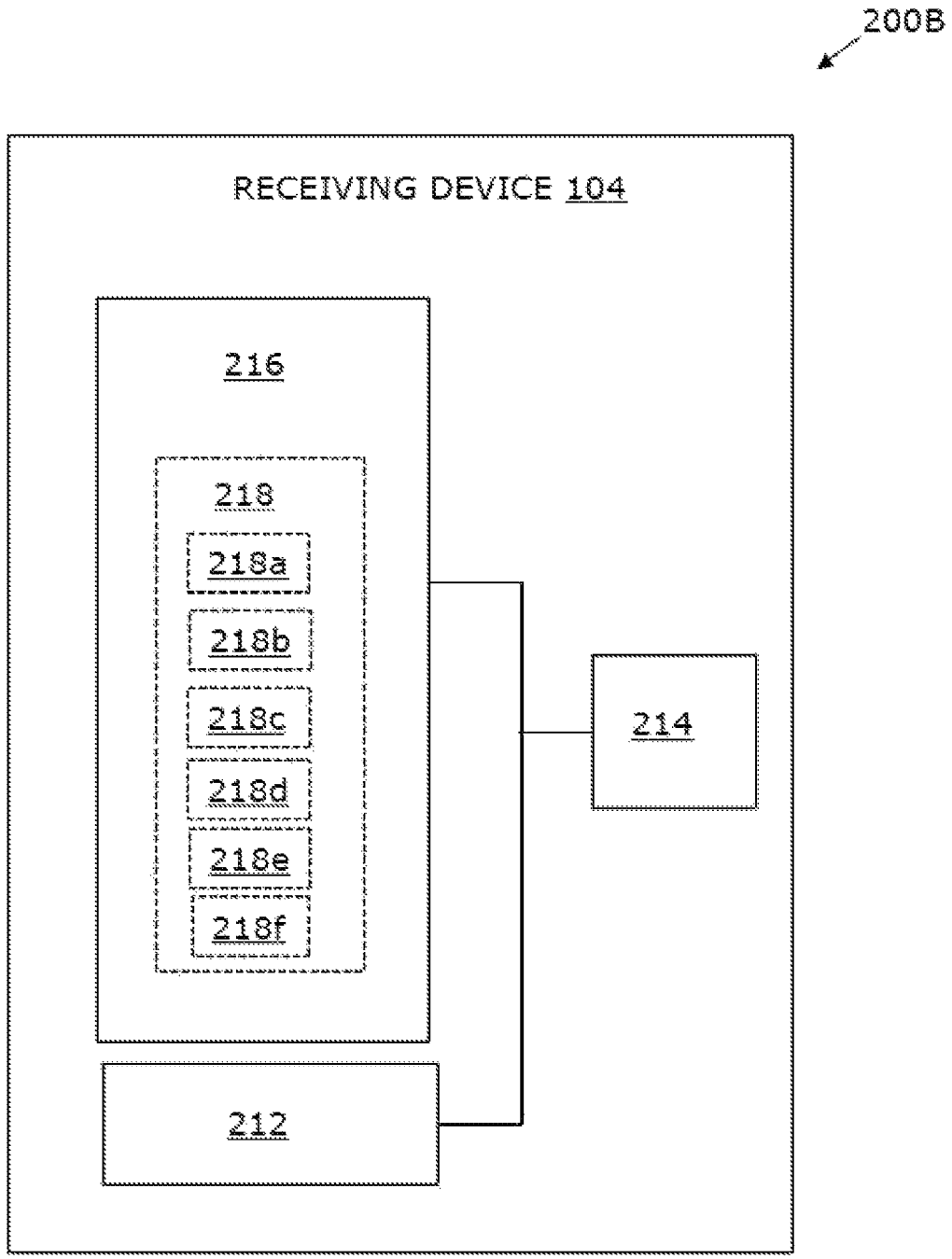
FIG. 2B is a block diagram that illustrates various exemplary components of a receiving device, in accordance with an embodiment of the present disclosure.

FIG. 2B is a block diagram that illustrates various exemplary components of a receiving device, in accordance with an embodiment of the present disclosure. FIG. 2B is described in conjunction with elements from FIGS. 1 and 2A. With reference to FIG. 2B, there is shown a block diagram 200B of the receiving device 104 (of FIG. 1). The receiving device 104 includes a communications interface 212, a controller 214, and a memory 216. In an implementation, the receiving device 104 further includes one or more software modules, such as software modules 218.

The communication interface 212 is an arrangement of interconnected programmable and/or non-programmable components that are configured to facilitate data communication between one or more electronic devices. For example, a network interface card (NIC) is arranged in the communications interface 212 to process incoming messages and to perform various operations on the incoming messages. Furthermore, the communication interface 212 supports communication via various networks, such as a peer-to-peer network, a hybrid peer-to-peer network, LANs, RANs, MANs, WANs, all or a portion of a public network such as the global computer network known as the Internet, a private network, a cellular network and any other communication system or systems at one or more locations. Additionally, the communication interface 212 supports wired or wireless communication that can be carried out via any number of known protocols, including, but not limited to, IP, WAP, Frame Relay, or ATM.

The controller 214 includes suitable logic, circuitry, and/or interfaces that is configured to receive a first message from a sending device (such as the sending device 102) over the communications interface 212, the first message indicating a first operation. The controller 214 is a computational element that is configured to process the instructions that drive the receiving device 104. Examples of the controller 214 includes, but are not limited to, a network interface controller, a microprocessor, a microcontroller, a CISC microprocessor, a RISC microprocessor or a VLIW microprocessor.

In operation, the controller 214 is configured to receive a first message from the sending device 102 over the communications interface 212. The first message indicates a first operation. The first message indicates the first operation such as a read operation, a write operation, a send operation, or an atomic operation. The first message is transmitted in the form of one or more data packets. In an example, the data packet of the first message potentially comprises a PSN to enforce correct order of the first message. The first message also comprises source and destination QP numbers. The first message potentially further comprises memory address for the read, write and atomic operations. The first message further comprises an operation type and an operand data. The controller 214 of the receiving device 104 is further configured to process incoming data packets from the sending device 102, perform operations accordingly and return the information to the sending device 102, if required.

The controller 214 is further configured to execute the first operation. The controller 214 of the receiving device 104 processes the first message and performs operation according to the first operation indicated by the first message. For example, the first message indicates a read operation as the first operation then the controller 214 of the receiving device 104 performs read operation accordingly.

The controller 214 is further configured to receive a second message from the sending device 102 over the communications interface 212. The second message indicates a second operation, wherein the second operation is associated with the first operation. The second message indicates the second operation type such as a read operation, a write operation, a send operation or an atomic operation. The second message is transmitted in the form of one or more data packets. The data packet of the second message comprise a PSN to enforce correct order of the second message. The second message further comprises source and destination QP numbers. The second message comprises memory address for the read, write and atomic operations. The second message comprises operation type and operand data. The second operation is associated with the first operation. For example, the second operation type is executed after a predefined time delay from execution of the first operation type. Hence, the second message is received by the controller 214 after the predefined time delay has passed since transmission of the first message. The time duration is maintained by the local pacing timer 204 of the sending device 102.

The controller 214 is further configured to determine if the first operation is being executed, and if so, generate an indication message comprising an indication to this effect and transmit the indication message to the sending device 102. As the second operation is associated with the first operation, the controller 214 determines if the first operation is being executed before starting execution of the second operation. This is done to ensure correct order of transmission of the first message and the second message by the controller 214. If the controller 214 has started execution of the first message, the controller 214 of the receiving device 104 generates the indication message that indicates result of the first operation executed by the controller 214 of the receiving device 104. The controller 214 transmits the indication message to the sending device 102 to acknowledge that the first operation is successfully executed. The indication message may comprise results according to the first operation. Hence, the controller 214 may start execution of the second message after the first operation have completed. This decreases buffer overflow on the receiving device 104 and increases the overall throughput.

In another embodiment, the second operation may be not associated with the first operation. Then, the second message may be received by the controller 214 regardless to whether the first operation has executed or not.

In an exemplary aspect, the receiving device 104 comprises the memory 216 and the communication interface 212, and software modules 218. The software modules 218 includes a first message receiving software module 218a for receiving a first message from the sending device 102 over the communications interface 212, the first message indicating a first operation. The software modules 218 further comprises an operation executing software module 218b for executing the first operation. The software modules 218 further comprises a second message receiving software module 218c for receiving a second message from the sending device 102 over the communications interface 212, the second message indicating a second operation, wherein the second operation is associated with the first operation. The software modules 218 further comprises an operation execution determining software module 218d for determining if the first operation is being executed, and if so executing an indication message generating software module 218e for generating an indication message comprising an indication to this effect and an indication message transmitter software module 218f for transmitting the indication message to the sending device 102.

The operation execution determining software module 218d determines if the first operation is being executed before starting execution of the second message. This ensures correct order of execution of the first message and the second message by the controller 214 of the receiving device 104. The indication message transmitter software module 218f of the receiving device 104 transmits the indication message to the sending device 102 to acknowledge that the first operation is executed. This decreases buffer overflow on the receiving device 104 and increases the overall throughput. The software modules 218 are executed by the controller 214 of the receiving device 104.

Figure 3:
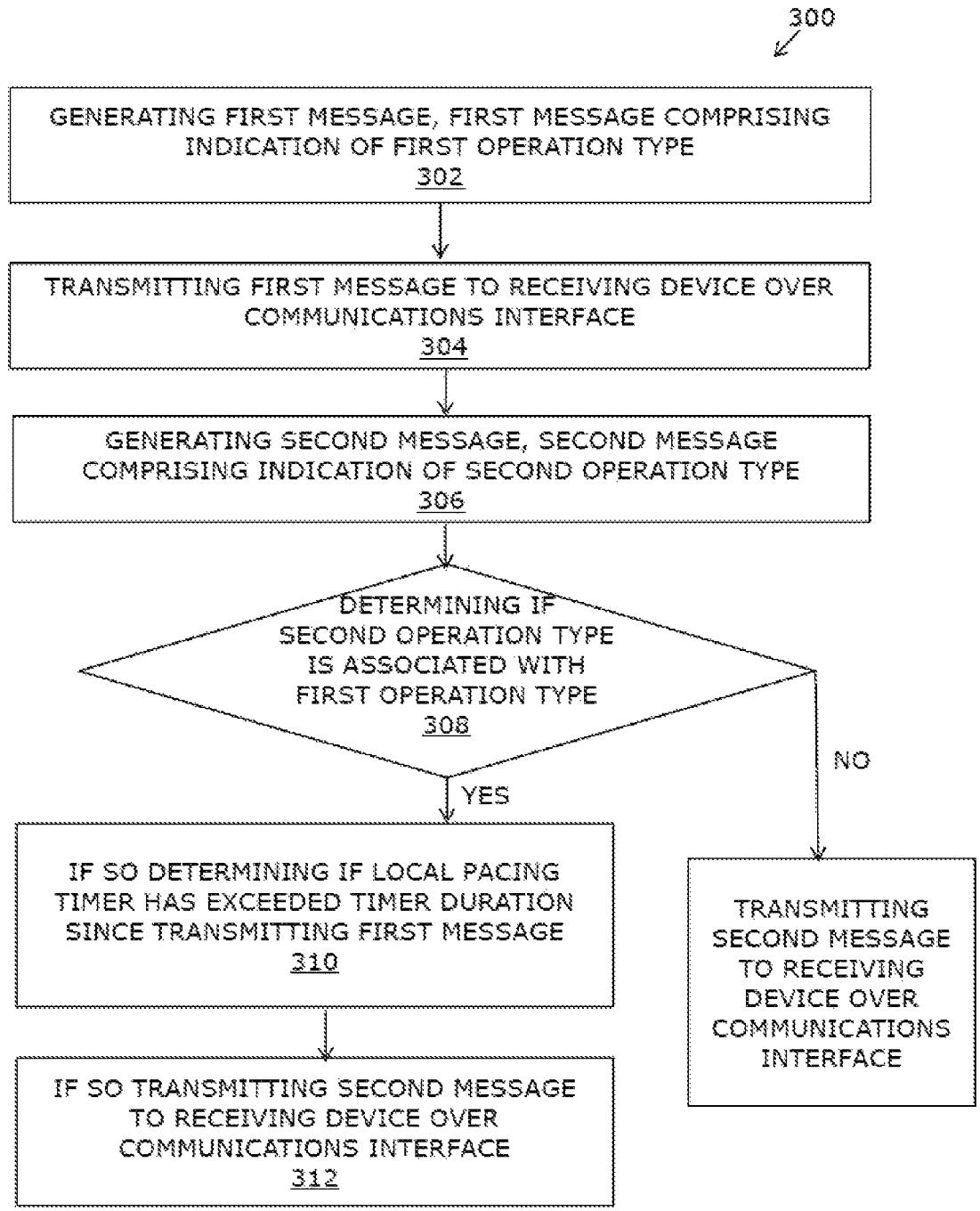
FIG. 3 is a flowchart of a method for a sending device, in accordance with an embodiment of the present disclosure.

FIG. 3 is a flowchart of a method for a sending device, in accordance with an embodiment of the present disclosure. FIG. 3 is described in conjunction with elements from FIGS. 1, 2A, and 2B. With reference to FIG. 3 there is shown a method 300 to reduce latency in a RDMA system (e.g. the RDMA system 100). The method 300 is executed by the controller 206 of the sending device 102 which has been described in detail, for example, in FIGS. 1 and 2A. The method 300 includes steps 302 to 312.

At step 302, the method 300 comprises generating a first message. The first message comprises an indication of a first operation type. The first message is generated by the controller 206 of the sending device 102 to initiate the RDMA operation with another computing device. The first message indicates the first operation type, such as a read operation, a write operation, a send operation or an atomic operation.

At step 304, the method 300 further comprises transmitting the first message to a receiving device over the communication interface 208. The first message is transmitted by the controller 206 of the sending device 102 over the communication interface 208 to the receiving device 104.

The receiving device 104 performs first operation type according to the first message. For example, if the first operation type is a read operation, then the receiving device 104 performs the read operation on the first message.

At step 306, the method 300 further comprises generating a second message. The second message comprises an indication of a second operation type. The second message is generated by the controller 206 of the sending device 102 to initiate the RDMA operation with the receiving device 104. The second message indicates the second operation type such as a read operation, a write operation, a send operation, or an atomic operation.

At step 308, the method 300 further comprises determining if the second operation type is associated with the first operation type. The controller 206 of the sending device 102 determines if the second operation type is associated with the first operation type. For example, in a case, the second operation type may be fenced to enforce transmission of the second message and the first message in a particular order. The fencing of the second operation type may cause the sending device 102 to delay the sending of the second message. Therefore, the second operation type is executed after a predefined time delay from execution of the first operation type. The fencing of the second operation type indicates the association with the first operation type and therefore, local pacing timer 204 is required for introducing the predefined time delay to execute the first operation type and the second operation type in the particular order while consuming less time. In another case, if the second operation type is not fenced (or not associated) with the first operation type, then the second operation type is executed regardless whether the first operation type is executed or not. And in such a case, the local pacing timer 204 is not required.

At step 310, the method 300 further comprises determining if the local pacing timer 204 has exceeded a timer duration since transmitting the first message, wherein the local pacing timer is a first operation type timer. In the scenario, if the second operation type is associated with the first operation type, the sending device 102 uses the local pacing timer 204 to control the time delay between transmission of the first message and the second message. The timer duration is the amount of time required to maintain proper order of execution of the first operation type and the second operation type. The local pacing timer 204 may start and expire according to the timer duration determined. For example, the local pacing timer 204 may be started by the controller 206 of the sending device 102 after transmitting the first message to the receiving device 104. The local pacing timer 204 expires when the time delay exceeds the pre-determined timer duration since transmitting the first message. As discussed above, it may also be determined if a traffic congestion timer has exceeded a congestion timer duration since transmitting the first message before transmitting the second message to the receiving device 104 over the communication interface 108.

At step 312, the method 300 further comprises transmitting the second message to the receiving device 104 over the communication interface 208. Once the local pacing timer 204 is expired, the controller 206 transmits the second message to the receiving device 104 over the communication interface 208. Hence, the local pacing timer 204 reduces total transmission time of the first message and the second message significantly and reduces latency which in turn speed up the data communication.

The steps 302 and 312 are only illustrative and other alternatives can also be provided where one or more steps are added, one or more steps are removed, or one or more steps are provided in a different sequence without departing from the scope of the claims herein.

In accordance with an embodiment, a computer-readable medium carrying computer instructions that when loaded into and executed by a controller 206 of a sending device 102 enables the sending device 102 to implement the method 200. A computer-readable medium carrying computer instructions provides a non-transient memory may include, but is not limited to, an electronic storage device, a magnetic storage device, an optical storage device, an electromagnetic storage device, a semiconductor storage device, or any suitable combination of the foregoing.

Figure 4:
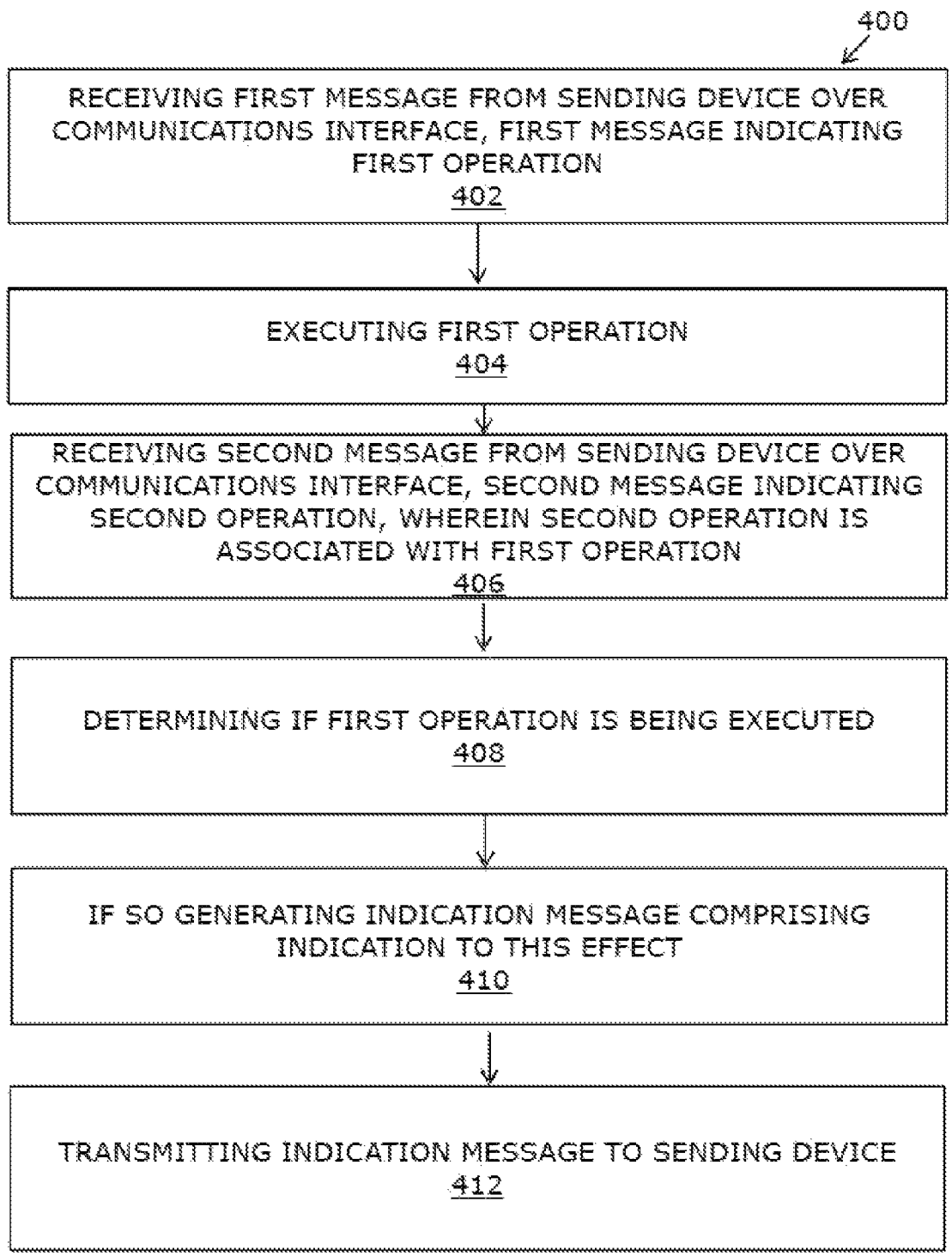
FIG. 4 is a flowchart of a method for a receiving device, in accordance with an embodiment of the present disclosure.

FIG. 4 is a flowchart of a method for a receiving device, in accordance with an embodiment of the present disclosure. FIG. 4 is described in conjunction with elements from FIGS. 1 and 3. With reference to FIG. 4 there is shown a method 400. The method 400 is executed by the controller 214 of the receiving device 104 which has been described in detail, for example, in FIGS. 1 and 2B. The method 400 includes steps 402 to 410.

At step 402, the method 400 comprises receiving the first message from the sending device 102 over the communications interface 212. The first message indicating a first operation. The first message indicates the first operation such as a read operation, a write operation, a send operation or an atomic operation.

At step 404, the method 400 further comprises executing the first operation. The first operation is executed by the controller 214 of the receiving device 104. For example, if the first operation is a read operation, then the read operation is executed by the controller 214.

At step 406, the method 400 further comprises receiving a second message from the sending device 102 over the communications interface 212. The second message indicates a second operation, wherein the second operation is associated with the first operation. The controller 214 is configured to receive the second message is received by the controller 214. The second message indicates the second operation type such as a read operation, a write operation, a send operation or an atomic operation. The second operation is associated with the first operation. For example, if the second message is fenced by the first message and the second operation type is executed after the predefined delay from execution of the first operation type. Hence, the second message is received by the controller 214 after the timer duration has passed since transmission of the first message. The timer duration is maintained by the local pacing timer 204 of the sending device 102.

At step 408, the method 400 further comprises determining if the first operation is being executed. As the second operation is associated with the first operation, the controller 214 determines if the first operation is successfully executed before starting execution of the second message. This is done to ensure correct order of execution of the first message and the second message by the controller 214 of the receiving device 104.

At step 410, the method 400 further comprises generating an indication message if the first operation is being executed comprising an indication to this effect and transmitting the indication message to the sending device 102. If the controller 214 has started execution of the first message, the controller 214 of the receiving device 104 generates the indication message that indicates result of the first operation. The controller 214 transmits the indication message to the sending device 102 to acknowledge that the first operation is being executed. Hence, the controller 214 may start execution of the second message before the first operation have completed. This decreases buffer overflow on the receiving device 104 and increases the overall throughput.

The steps 402 and 410 are only illustrative and other alternatives can also be provided where one or more steps are added, one or more steps are removed, or one or more steps are provided in a different sequence without departing from the scope of the claims herein.

In one embodiment, the receiving device 104 is arranged to implement a pacing timer for sending responses or other messages to the sending device 102. Effectively, in such an implementation the receiving device 104 operates both as a receiving device and as a sending device 102.

In accordance with an embodiment, a computer-readable medium carrying computer instructions that when loaded into and executed by the controller 214 of the receiving device 104 enables the receiving device 104 to implement the method 400. The computer-readable medium carrying computer instructions provides a non-transient memory may include, but is not limited to, an electronic storage device, a magnetic storage device, an optical storage device, an electromagnetic storage device, a semiconductor storage device, or any suitable combination of the foregoing.

Figure 5:
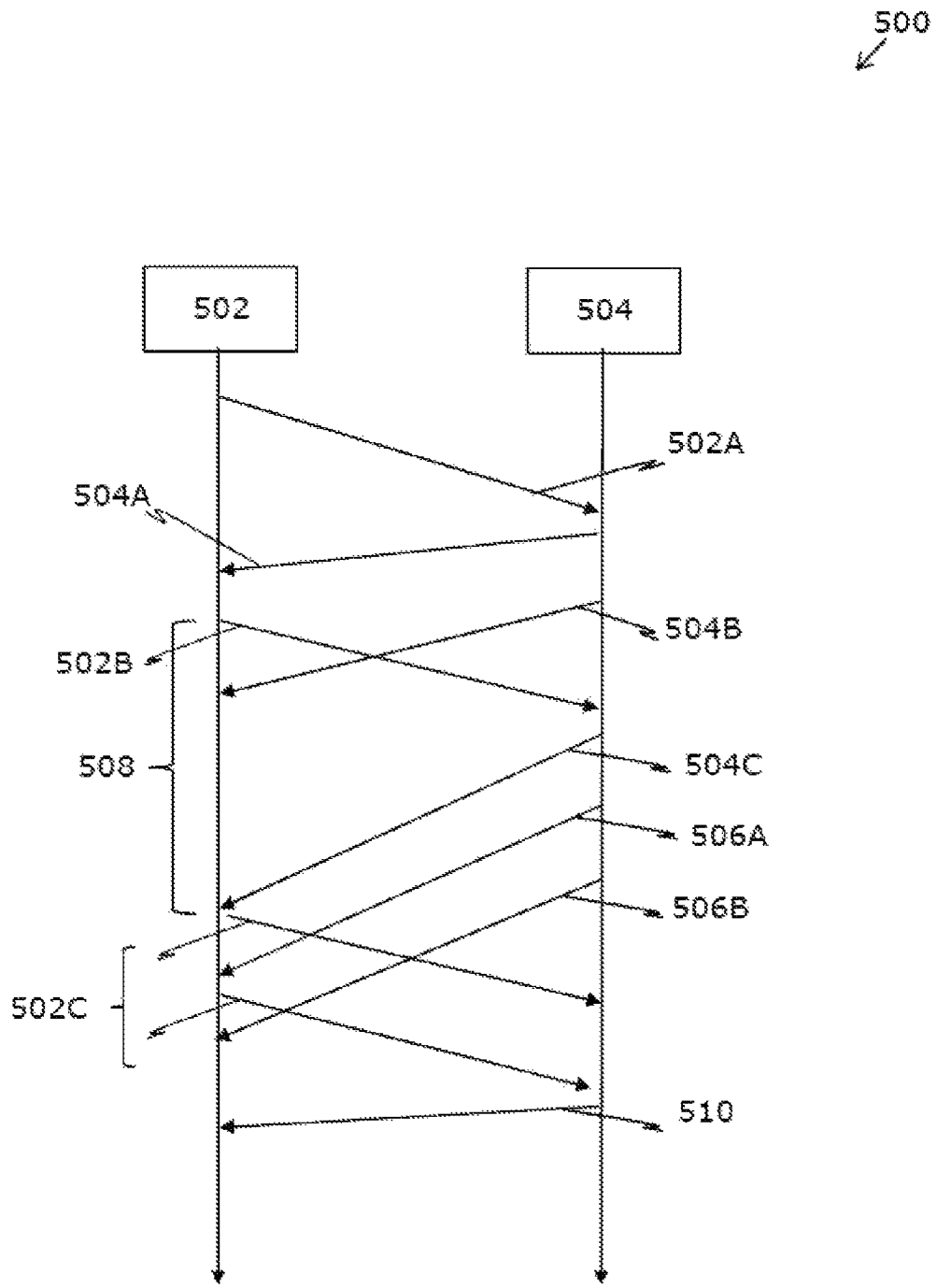
FIG. 5 is an illustration of an exemplary scenario of RDMA operations with a prefetch traffic pacer, in accordance with an embodiment of the present disclosure.

FIG. 5 is an illustration of an exemplary scenario of a RDMA operation with a prefetch traffic pacer, in accordance with an embodiment of the present disclosure. FIG. 5 is described in conjunction with elements from FIGS. 1, 2A, 2B, 3, and 4. With reference to FIG. 5, there is shown an exemplary scenario 500 that includes a sending device 502 and a receiving device 504. The sending device 502 is configured to transmit a first message 502A, a second message 502B, and a third message 502C to the receiving device 504 for the RDMA operation. The receiving device 504 provides replies, such as indication messages 504A, 504B and 504C, in response to the first message 502A, and 506A, and 506B in response to the second message 502B, and 510 in response to the third message 502C, to the sending device 502.

In the exemplary scenario 500, the sending device 502 and the receiving device 504 corresponds to the sending device 102 and the receiving device 104 of FIG. 1. In the exemplary scenario 500, the first message 502A is a first read operation type and the second message 502B is a second read operation type. The third message 502C is a write operation type. The first read operation type (indicated by the first message 502A) is not associated with the second read operation type (indicated by the second message 502B). Hence, the second message 502B may be transmitted after transmitting the first message 502A to the receiving device 504 regardless if the first message 502A has completed.

When the first read operation type (indicated by the first message 502A) is being executed, a controller (e.g., the controller 214 and not shown here for the sake of brevity) of the receiving device 504 generate a first indication message 504A, a second indication message 504B and a third indication message 504C consecutively, as responses to represent the successful execution of the first read operation type.

The second message 502B is transmitted when the first read operation is being executed and the first indication message 504A is received by a controller (e.g. the controller 206 of FIG. 2A, not shown here for the sake of brevity) of the sending device 502. When the second read operation (indicated by the second message 502B) is being executed, the controller (e.g. the controller 214 of FIG. 2B) of the receiving device 504 generate a first indication message 506A, and a second indication message 506B as responses to represent the successful execution of the second read operation type.

The write operation type (indicated by the third message 502C) is associated with the second read operation type (indicated by the second message 502B) and therefore, the third message 502C is transmitted after the timer duration 508 (controlled by a local pacing timer such as the local pacing timer 204) has passed since transmission of the second message 502B. The controller (e.g., the controller 206) of the sending device 502 determines if the local pacing timer (e.g., the local pacing timer 204 and not shown here for the sake of brevity) has exceeded the timer duration 508 since transmitting the second message 502B. If the local pacing timer (e.g., the local pacing timer 204) has exceeded the timer duration 508, the controller (e.g., the controller 206) of the sending device 502 transmits the third message 502C to the receiving device 504. The write operation type (indicated by the third message 502C) is started by the controller (e.g., the controller 214 of FIG. 2B) of the receiving device 504 after execution of the second read operation type. After the execution of the write operation type (indicated by the third message 502C), the controller (e.g., the controller 214) of the receiving device 504 sends an acknowledge message 510 to the sending device 502. Hence, the local pacing timer (e.g., the local pacing timer 204) allows transmission of the third message 502C before execution of the second message 502B that reduces total execution time of the first operation, the second operation and the third operation significantly and results in low latency and speed up the data communication.

Figure 6:
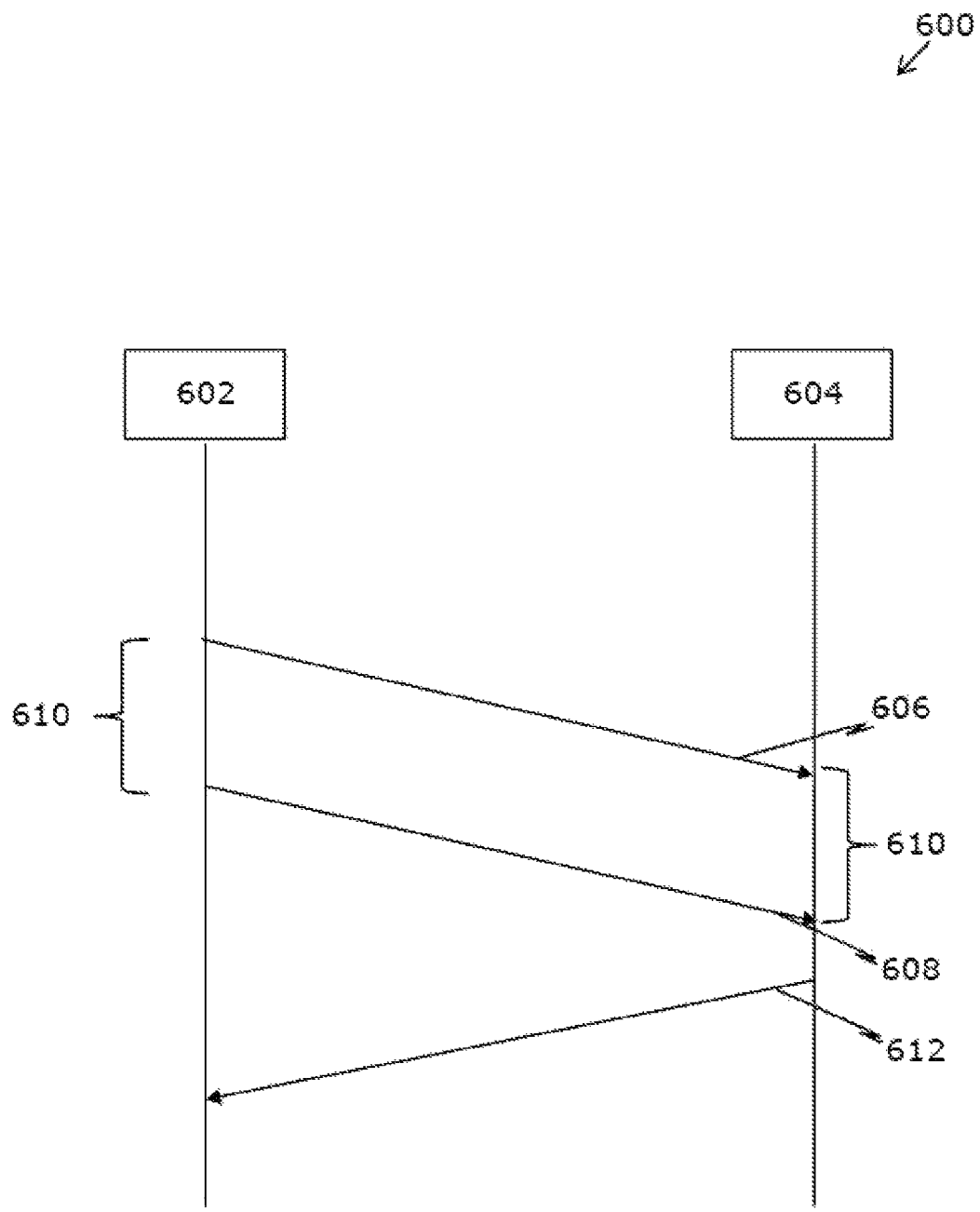
FIG. 6 is an illustration of an exemplary scenario of RDMA operations with a prefetch traffic pacer, in accordance with another embodiment of the present disclosure.

FIG. 6 is an illustration of an exemplary scenario of RDMA operation with a prefetch traffic pacer, in accordance with an embodiment of the present disclosure. FIG. 6 is described in conjunction with elements from FIGS. 1, 2A, 2B, 3, 4, and 5. With reference to FIG. 6, there is shown an exemplary scenario 600 that includes a sending device 602 and a receiving device 604. The sending device 602 transmits a first message 606 and a second message 608 to the receiving device 604. The first message 606 comprises an indication of a first operation type and the second message 608 comprises an indication of a second operation type. The receiving device 604 provides an acknowledgement message 610 as a response (or reply) to the first message 606 and the second message 608 to the sending device 602.

In the exemplary scenario 600, the sending device 602 and the receiving device 604 corresponds to the sending device 102 and the receiving device 104 of FIG. 1. In the exemplary scenario 600, the first message 606 comprises the indication of the first operation type which belongs to a preparatory action to be followed by the receiving device 604. The preparatory action is an operation performed by the receiving device 604 to prepare the memory (e.g., local memory buffers) prior to receiving a request for the RDMA operation. For example, when a non-pinned RDMA system is used, the sending device 602 sends a prefetch hint message as the first message 606 to the receiving device 604. The first message 606 (or the prefetch hint) gives time to the receiving device 604 to prepare its memory (i.e., the local memory buffers) before the actual request of the RDMA operation targeting the memory (i.e., the local memory buffers) arrives. For example, if the second message 608 comprises an indication of a write operation type, the receiving device 604 prepares a virtual memory address 0x1000 after receiving the first message 606 (or the prefetch hint) to execute the write operation in less time. The second message 608 is transmitted to the receiving device 604 after a time duration 610 from transmitting the first message 606 to ensure successful performance of the preparatory action. The time duration 610 between transmission of the first message 606 and the second message 608 is controlled by a local pacing timer (e.g., the local pacing timer 204 of FIG. 1). For example, the local pacing timer (e.g., the local pacing timer 204) starts when the first message 606 is transmitted and ends when the second message 608 is transmitted. The time duration 610 is determined according to conditions such as number of messages queued for transmission at a communication interface (e.g., the communication interface 208), the average processing time for the preparatory action, etc. For example, the time duration 610 is determined according to the memory page-in latency of the receiving device 604 to prepare the virtual memory address 0x1000 after receiving the first message 606 (or the prefetch hint). The receiving device 604 may transmit an indication message 612 to the sending device 602 to acknowledge successful execution of the second operation type. Hence, the local pacing timer (e.g., the local pacing timer 204) reduces the overall transmission time of the first message 606 and the second message 608 by eliminating a full round-trip time for the acknowledge message 612 of the preparatory action and decreases the latency.

Figure 7:
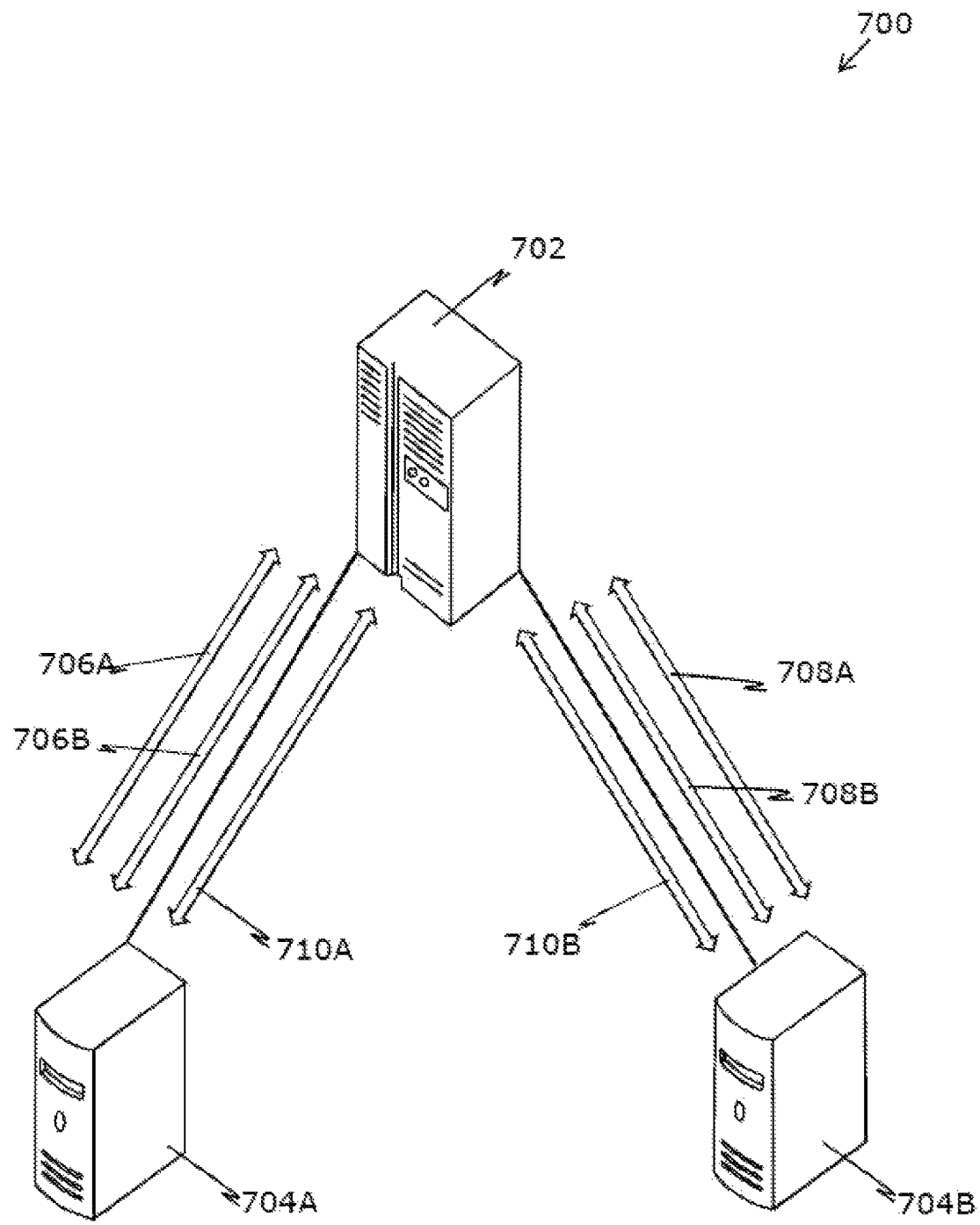
FIG. 7 is an illustration of an exemplary scenario of implementation of a RDMA system, in accordance with an embodiment of the present disclosure.

FIG. 7 is an illustration of an exemplary scenario of a RDMA system, in accordance with an embodiment of the present disclosure. FIG. 7 is described in conjunction with elements from FIGS. 1, 2A, 2B, and 3 to 6. With reference to FIG. 7, there is shown an exemplary scenario of a RDMA system 700 that includes a sending device 702 (i.e., a requesting device) and two responding devices referred to as a first receiving device 704A and a second receiving device 704B.

The sending device 702 corresponds to the sending device 102 (of FIG. 1). Similarly, each of the first receiving device 704A and the second receiving device 704B corresponds to the receiving device 104 (of FIG. 3). The sending device 702 is also referred as a requesting device or a requester. The first receiving device 704A may also referred as a first responding device (e.g., responder #1). Similarly, the second receiving device 704B may also referred as a second responding device (e.g., responder #2).

In operation, in the exemplary scenario 700, the sending device 702 is configured to transmit multiple messages to the first receiving device 704A and the second receiving device 704B respectively, for initiating multiple RDMA operations. The sending device 702 is configured to transmit a first message 706A (e.g., QP 11) and a second message 706B (e.g., QP 21) to the first receiving device 704A. The second message 706B will be transmitted after transmission of the first message 706A. The first message 706A (i.e., QP 11) indicates a read operation type. The first message 706A comprises parameters such as remote key is 30, virtual memory address is 0x1000, the first message length is 0x8000 for performing the read operation type. Further, the second message 706B (i.e., QP 21) indicates a write operation type. The second message 706B comprises parameters such as remote key is 40, virtual memory address is 0x100000 and the second message length is 0x1040 for performing the write operation type.

The sending device 702 is further configured to transmit a third message 708A (i.e., QP 12) and a fourth message 708B (e.g., QP 22) to the second receiving device 704B. The fourth message 708B will be transmitted after transmission of the third message 708A. The third message 708A (i.e., QP 12) indicates a read operation type. The third message 708A (i.e., QP 12) comprises parameters such as remote key is 30, virtual memory address is 0x50000, the third message length is 0x1000 for performing the read operation type. Further, the fourth message 708B (i.e., QP 22) indicates an atomic operation type. The fourth message 708B (i.e., QP 22) further comprises parameters such as remote key is 50 and virtual memory address is 0x60000 for performing the atomic operation type.

The sending device 702 generates a first prefetch hint message 710A (e.g., QP 101) that indicate preparatory actions to be performed by the first receiving device 704A. Further, the sending device 702 generates a second prefetch hint message 710B (i.e., QP 102) that indicate preparatory actions to be performed by the second receiving device 704B. The first prefetch hint message 710A (i.e., QP 101) and the second prefetch hint message 710B (i.e., QP 102) may be transmitted by the sending device 702 in a special management message. For example, a user datagram (UD) message may be sent to the first receiving device 704A and the second receiving device 704B for the first prefetch hint message 710A and the second prefetch hint message 710B.

The first prefetch hint message 710A (i.e., QP 101) indicates the first receiving device 704A about preparatory actions to be performed by use of the different parameters such as remote key, virtual memory address and the message length regarding the first message 706A (i.e. QP 11) and the second message 706B (i.e. QP 21) respectively. Similarly, the second prefetch hint message 710B (i.e., QP 102) indicates the second receiving device 704B about preparatory actions to be performed by use of the different parameters such as remote key, virtual memory address, the message length and operand data (for the atomic type operation) regarding the third message 708A (i.e., QP 12) and the fourth message 708B (i.e., QP 22).

The first receiving device 704A after receiving the first prefetch hint message 710A (i.e., QP 101) requests contexts for the first message 706A (i.e., QP 11) and the second message 706B (i.e., QP 21) to be brought into a cache of the first receiving device 704A. Similarly, the second receiving device 704B after receiving the second prefetch hint message 710B (i.e., QP 102) requests contexts for the third message 708A (i.e. QP 12) and the fourth message 708B (i.e., QP 22) to be brought into a cache of the second receiving device 704B. Further, the first receiving device 704A and the second receiving device 704B immediately sends requests to their respective memory page for each of the ranges with appropriate attributes (not waiting for the request packets to arrive). The second receiving device 704B also fetches the atomic operation original data from its memory. The first receiving device 704A and the second receiving device 704B each may also send the indication message to the sending device 702 to acknowledge that prefetch hints are processed.

Further, the sending device 702 comprises a local pacing timer (e.g. the local pacing timer 204 and not shown here for sake of brevity). The local pacing timer controls a time duration between the prefetch hints 710A and 710B and transmission of the first message 706A, the second message 706B, third message 708A and the fourth message 708B. For example, the sending device 702 starts the local pacing timer after transmitting the first prefetch hint message 710A and the second prefetch hint message 710B to the first receiving device 704A and the second receiving device 704B, respectively. The time duration is determined according to conditions such as number of messages queued for transmission by the sending device 702, network congestion and the average processing time for the preparatory action.

The sending device 702 transmits the first message 706A when the local pacing timer expires indicating that the first receiving device 704A and the second receiving device 704B have executed the preparatory actions. The sending device 702 further transmits the second message 706B, third message 708A and the fourth message 708B while maintaining particular order of transmission of the messages. Hence, the local pacing timer (e.g. the local pacing timer 204) gives the first receiving device 704A and the second receiving device 704B enough time to prepare their memory and enables successful RDMA operation. Further, the local pacing timer reduces the overall transmission time of the first message 706A, the second message 706B, third message 708A and the fourth message 708B by eliminating a full round-trip time for the acknowledge message of the preparatory action and decreases the latency.

In an exemplary aspect, the present disclosure provides a system (e.g. the RDMA system 100 or 700). The system (i.e. the RDMA system 100 or 700) comprises a sending device (e.g. the sending device 102 or 702) and a receiving device (e.g. the receiving device 104, 704A, or 704B). In an implementation, the system (i.e. the RDMA system 100 or 700) may further comprises the sending device 102 comprising the memory 202, the communication interface 208, and software modules 210 and the receiving device 104 comprising the memory 216, the communication interface 212, and software modules 218. Various operations of the sending device 102 and the receiving device 104 and their components has been described in detail, for example, in FIGS. 1, 2A, and 2B.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the disclosure, which are, for brevity, described in the context of a single embodiment, may also be provided separately or in any suitable combination or as suitable in any other described embodiment of the disclosure.

What is claimed is:

1. A sending device comprising:
a memory configured to store a local pacing timer that is a first operation type timer;
a communications interface coupled to the memory; and
a controller coupled to the memory and the communications interface and configured to cause the sending device to:
generate a first message comprising a first indication of a first operation type, wherein the first operation type indicates a preparatory action to be performed by a receiving device;
transmit the first message to the receiving device over the communications interface;
generate a second message comprising a second indication of a second operation type;
determine whether the second operation type is associated with the first operation type;
determine, when the second operation type is associated with the first operation type, whether the local pacing timer has exceeded a timer duration since transmitting the first message; and
transmit, when the local pacing timer has exceeded the timer duration since transmitting the first message, the second message to the receiving device over the communications interface.

2. The sending device of claim 1, wherein the controller is further configured to cause the sending device to:
determine that the second operation type is not associated with the first operation type; and
transmit, when the second operation type is not associated with the first operation type, the second message to the receiving device over the communications interface regardless of whether the local pacing timer has exceeded the timer duration since transmitting the first message or not.

3. The sending device of claim 1, wherein the controller is further configured to cause the sending device to:
generate a third message comprising a third indication of a third operation type that is associated with the first operation type;
determine whether the local pacing timer has exceeded the timer duration since transmitting the second message; and
transmit, in response to determining that the local pacing timer has exceeded the timer duration since transmitting the second message, the third message to the receiving device over the communications interface.

4. The sending device of claim 3, wherein the third operation type is the same as the second operation type.

5. The sending device of claim 1, wherein the first operation type is the same as the second operation type.

6. The sending device of claim 1, wherein the controller is further configured to cause the sending device to:
receive an acknowledgement message from the receiving device; and
transmit, in response to receiving the acknowledgement message, the second message to the receiving device over the communications interface regardless whether the local pacing timer has exceeded the timer duration.

7. The sending device of claim 1, wherein the controller is further configured to cause the sending device to adapt the timer duration.

8. The sending device of claim 7, wherein the controller is further configured to cause the sending device to further adapt the timer duration based on one or more of:
a number of active connections established over the communications interface;
information regarding an operating status of the receiving device;
a number of negative confirmation (NAK) messages received; or
a received indication from the receiving device.

9. The sending device of claim 1, wherein the timer duration comprises:
a first timer duration that is associated with one operation type; and
a second timer duration that is associated with another operation type.

10. The sending device of claim 1, wherein the first operation type is associated with a memory area, and wherein the second operation type is associated with the memory area.

11. The sending device of claim 1, wherein the controller is further configured to cause the sending device to:
   determine that a traffic congestion timer has exceeded a congestion timer duration since transmitting the first message; and
   further transmit, in response to determining that the traffic congestion timer has exceeded the congestion timer duration, the second message to the receiving device over the communications interface.

12. The sending device of claim 1, wherein the controller is further configured to cause the sending device to:
   determine that the local pacing timer has exceeded a congestion timer duration since transmitting the first message; and
   further transmit, in response to determining that the local pacing timer has exceeded the congestion timer duration since transmitting the first message, the second message to the receiving device over the communications interface.

13. The sending device of claim 1, wherein the sending device is a requesting device in a remote direct memory access (RDMA) system.

14. The sending device of claim 13, wherein the second operation type indicates an operation for which the preparatory action is performed.

15. The sending device of claim 1, wherein the sending device is a responding device in a remote direct memory access (RDMA) system.

16. The sending device of claim 15, wherein the first operation type indicates a read operation, wherein the first message indicates a read result, wherein the second operation type indicates the read operation, and wherein the second message indicates a subsequent read result.

17. A method implemented by a sending device, wherein the method comprises:
   generating a first message comprising a first indication of a first operation type, wherein the first operation type indicates a preparatory action to be performed by a receiving device;
   transmitting the first message to the receiving device over a communications interface;
   generating a second message comprising a second indication of a second operation type;
   determining whether the second operation type is associated with the first operation type;
   determining, when the second operation type is associated with the first operation type, whether a local pacing timer has exceeded a timer duration since transmitting the first message, wherein the local pacing timer is a first operation type timer; and
   transmitting, when the local pacing timer has exceeded the timer duration since transmitting the first message, the second message to the receiving device over the communications interface.

18. The method of claim 17, further comprising:
   determining whether the second operation type is not associated with the first operation type; and
   transmitting, when the second operation type is not associated with the first operation type, the second message to the receiving device over the communications interface regardless of whether the local pacing timer has exceeded the timer duration since transmitting the first message or not.

19. A non-transitory computer-readable medium storing computer instructions that, when executed by a controller of a sending device, cause the sending device to:
   generate a first message comprising a first indication of a first operation type, wherein the first operation type indicates a preparatory action to be performed by a receiving device;
   transmit the first message to the receiving device over a communications interface;
   generate a second message comprising a second indication of a second operation type;
   determine whether the second operation type is associated with the first operation type;
   determine, when the second operation type is associated with the first operation type, whether a local pacing timer has exceeded a timer duration since transmitting the first message, wherein the local pacing timer is a first operation type timer; and
   transmit, when the local pacing timer has exceeded the timer duration since transmitting the first message, the second message to the receiving device over the communications interface.

20. The non-transitory computer-readable medium of claim 19, wherein the computer instructions, when executed by the controller, further cause the sending device to:
   determine whether the second operation type is not associated with the first operation type; and
   transmit, when the second operation type is not associated with the first operation type, the second message to the receiving device over the communications interface regardless of whether the local pacing timer has exceeded the timer duration since transmitting the first message or not.

* * * * *